United States Patent [19]

Gavin et al.

[11] Patent Number: 5,782,945
[45] Date of Patent: Jul. 21, 1998

[54] METHOD FOR FORMING SILVER TRACKS ON GLASS

[75] Inventors: David L. Gavin, Caversham; Patricia M. Harris, Shinfield; Detlef Rehorek, Gerendalsweg, all of United Kingdom

[73] Assignee: Cookson Matthey Ceramics PLC, London, United Kingdom

[21] Appl. No.: 701,216

[22] Filed: Aug. 21, 1996

[30] Foreign Application Priority Data

Sep. 5, 1995 [GB] United Kingdom ............... 9518033

[51] Int. Cl.⁶ ................... C03C 17/00; C03C 25/02
[52] U.S. Cl. ................. 65/60.1; 65/60.2; 65/60.4; 501/14; 501/17; 501/19; 427/125; 427/126.2; 427/126.5
[58] Field of Search ................. 65/60.1, 60.2, 65/60.4; 427/125, 126.2, 126.5; 501/14, 17, 19

[56] References Cited

U.S. PATENT DOCUMENTS

| | | |
|---|---|---|
| 3,929,674 | 12/1975 | Patterson . |
| 4,101,710 | 7/1978 | Marcus . |
| 4,122,232 | 10/1978 | Kuo . |
| 4,446,059 | 5/1984 | Eustice . |
| 4,749,397 | 6/1988 | Chesworth et al. ............ 65/60.2 |
| 4,959,090 | 9/1990 | Reinherz ....................... 65/60.4 |
| 4,983,196 | 1/1991 | Stotka ............................ 65/24 |
| 5,141,798 | 8/1992 | Chaumonot et al. . |
| 5,296,413 | 3/1994 | Carroll et al. . |
| 5,346,651 | 9/1994 | Oprosky et al. . |
| 5,350,718 | 9/1994 | Anquetil et al. ................ 501/21 |

FOREIGN PATENT DOCUMENTS 0712814  5/1996  European Pat. Off. .

OTHER PUBLICATIONS

EPO Search Report issued Nov. 22,1996 in corresponding application No. EP 96 30 5951.
Patent Abstracts of Japan, vol. 95, No. 004 and its corresponding WPI English abstract (JP A 07 105719, Apr. 21, 1995).
Chemical Abstracts, vol.100, No. 14, Apr. 2, 1984 (JP A 58 201 202, Nov. 24, 1983).
British Search Report, 31 Oct. 1995.

*Primary Examiner*—Peter Chin
*Assistant Examiner*—Jacqueline A. Ruller
*Attorney, Agent, or Firm*—Stevens, Davis, Miller & Mosher, L.L.P.

[57] ABSTRACT

A method of forming electrically conducting silver tracks on glass, by applying a silver composition comprising solids portion in a carrier medium to the glass and then firing the composition to form the tracks, wherein the solids portion contains elemental silver and/or precursor thereof and contains also elemental boron.

14 Claims, No Drawings

METHOD FOR FORMING SILVER TRACKS ON GLASS

This invention relates to a method of forming electrically conducting silver tracks on glass, and to a composition for forming the tracks.

In the automotive industry, a silver composition is applied to window glass and fired to form electrically conductive silver tracks on the glass. These tracks are used particularly on rear, and less often front, windows to provide a de-mister. Current is usually distributed through individual conductor tracks by means of a wider silver strip, termed a bus bar, at the edges of the window.

In order to protect the adhesive used to glue windows into the motor vehicle body from being degraded by ultraviolet light, and also for aesthetic purposes, an enamel layer, usually black or grey, is provided around the edges of the window. It has become common to provide the silver bus bars on the enamel so as to obscure them from view from outside the vehicle. This, however, is not as effective as is desired. Silver ions tend to migrate from the silver layer through the enamel into the glass-enamel interface where they tend to become visible after reaction with reducing species present in the glass. Numerous proposals for modifying the frit in the enamel composition or for additives for the enamel composition have been made with a view to overcoming the problem. For instance, U.S. Pat. No. 5,141, 798 discloses an enamel containing, in addition to 60–89.9% by weight glass frit and 1–30% by weight pigments, an amount of 0.1–10% by weight total of at least one of silicon, boron, carbon, lead and silver in elemental form based on the weight of the enamel. Such proposals are still not completely satisfactory. Such enamels can form a blue colour under the bus bar, and this is particularly evident when green or blue glass is employed; green or blue glass is increasingly being employed to decrease the infra-red transmission of the glass, but the blue colouration is evident also with clear glass at high firing times and temperatures. Large amounts of the additives can be required to obscure the silver tracks, and this can be expensive or lead to disadvantages, for instance undesired colour shades. A need still exists to obscure the silver tracks. An object of the present invention is to meet this need.

Accordingly, the invention provides a method of forming electrically conducting silver tracks on glass, by applying a silver composition comprising solids portion in a carrier medium to the glass and then firing the composition to form the tracks, wherein the solids portion contains elemental silver and/or precursor thereof and contains also elemental boron.

The invention provides also a silver composition for forming, on firing, electrically conducting silver tracks on glass, the composition comprising solids portion in a carrier medium, the solids portion containing elemental silver and/ or precursor thereof, elemental boron and (A) 0.5–7% of alumina;

(B) 0.5–10% of metal other than silver; or (C) 0–8% of glass frit and, based on the weight of the elemental silver and/or precursor thereof, measured as silver, between 0.7 and 2% of the elemental boron.

It can be seen that the present invention tackles the problem of obscuring the silver tracks on the enamel not by modifying the enamel (though in an embodiment of the invention this is done in combination), as various proposals have done in the past, but by modifying the silver tracks. In the present invention, silver migration from the tracks through the enamel is reduced, leading to more obscured tracks. In addition, the present silver composition is more stable to blue discolouration under the bus bar. The present silver composition also possesses other advantageous properties. For the silver compositions used in automotive de-misting elements, it is advantageous for the resistivity of the fired composition to be as low as possible, so that the current, and hence heat, is higher. The boron in the present silver composition can decrease the resistivity of the silver track. It is aesthetically preferred that the silver has a light colour when it is visible from inside a motor vehicle; the present boron gives a whiter colour to the silver. Current is normally delivered to the bus bars via a T-piece soldered to one of the bus bars, and it is desirable that the T-piece be attached to the bus bar as strongly as possible; the present boron surprisingly does not mar the pull strength of the T-piece. The bus bars can contain a network of small cracks due to differential sintering and thermal expansion between the silver and the enamel; the present boron reduces the tendency of the silver to crack by affecting the sintering of the silver composition as it is fired. Fired silver normally becomes discoloured to a brownish colour by corrosion; advantageously, the present tracks resist this corrosion.

The invention provides in a silver composition for forming, on firing, electrically conducting silver tracks on glass, the use of elemental boron to impair silver migration, and hence provide tracks better obscured by enamel. U.S. Pat. No. 4,446,059 discloses a metallisation for printing conductor patterns upon a soda lime glass substrate comprising an admixture of finely divided particles of:

(1) 60 to 98.5 wt % conductive metal selected from the group consisting of Ag, Au, Cu and alloys and mixtures thereof, (2) 20 to 1 wt % inorganic binder, and (3) 20 to 0.5 wt % of a colourant which is a mixture of 5 to 60 wt % of an oxide of or a precursor of an oxide of copper, silver or mixtures thereof and 95 to 40 wt % of $B_2O_3$ or precursor thereof, the colourant being comprised of no more than 40 wt % of oxide of silver or 60 wt % of oxide of copper. This is with a view to avoiding the formation of white residues on the fired printed pattern from condensation of atmospheric moisture, reaction with silver or copper salt colourant, and then evaporation. This is a different problem to the present problem of obscuring silver tracks. We have found that incorporating 2% $B_2O_3$ into a conventional silver paste worsened, not improved, obscuring of the silver tracks compared to the silver paste without the $B_2O_3$.

The present silver composition is generally a paste. As is conventional, the present silver composition comprises solids portion in a carrier medium. The carrier medium may itself contain solid particles of resin, but these are removed in the firing and do not count as the solids portion. The carrier medium is the vehicle for applying the solids portion and is no longer present after firing. The composition contains generally 5–95%, preferably 50–95%, of the solids portion. Percentages in this specification are by weight unless otherwise indicated.

The solids portion usually contains 0.01–15, preferably 0.1–8, especially 0.5–4%, of the elemental boron. Increasing the content of the boron can increase the tendency of the colour of the fired composition viewed through the glass to become light yellow. If this colour is undesired aesthetically, a lower content of boron should be used.

The solids portion usually contains 10–99.5% of the silver moiety (ie the silver and/or precursor thereof), measured as silver. The content depends on the desired mode of application, and hence the viscosity desired. Preferably the content is 70–98%, especially when the composition is to be applied by screen printing. The precursor forms silver during the application process, particularly by decomposition on the firing. Preferably, however, silver itself rather than a precursor is employed. The silver can be in any particulate form. Preferably, the silver is silver powder and/or silver flake.

Where the silver composition is to be applied directly to the glass rather than to enamel composition on the glass, the silver composition advantageously contains glass frit, to facilitate adhesion to the glass. No frit is required, however, where the composition is applied onto enamel composition, for instance on the front window of a motor vehicle. The solids portion of the silver composition usually contains 0–85%, preferably 0–10%, especially 0–6%, of the frit. For instance, when frit is employed it can be 2–10%, eg 2–6%, of the solids portion.

In a particularly advantageous embodiment of the present invention, the solids portion contains 0–8% of glass frit and, based on the weight of the elemental silver and/or precursor thereof, measured as silver, between 0.7 and 2% of the elemental boron.

The silver composition contains carrier medium. This is the vehicle for applying the solids portion and can be conventional. The carrier medium is usually organic. Conventionally, the carrier medium is removed by drying or during the firing after application of the silver composition.

The silver composition can contain additives. The additives can be used to control properties of the composition in the fired or unfired state, such as its firing behaviour, the colour of the fired composition, its ability to be soldered, adhesion to any underlying enamel composition or to the glass, and the pull strength of the fired composition. Examples of additives are rhodium resinate or bismuth oxide. The additives can be conventional. Usually, the composition contains no more than 10% of additive. In a particular embodiment, the composition contains no colourant. In a further particular embodiment, the composition contains no colourant comprising an oxide of or a precursor of an oxide of copper, silver or mixtures thereof. In an advantageous embodiment of the present invention, the solids portion contains 0.5–7%, preferably 2–3%, of alumina. We have discovered that incorporating alumina into the composition makes the fired silver tracks more scratch resistant when exposed to acid, for instance to cleaning agents containing citric acid. Such scratch resistance has been demonstrated using HCl as a model. In a particularly advantageous embodiment of the present invention, the solids portion contains 0.5–10, preferably 1–2, % of metal other than silver. We have discovered that incorporating such metal, usually powder, into the composition also makes the fired silver tracks more scratch resistant when exposed to acid. The amount of additive to increase such scratch resistance should be an amount effective for this purpose. In the case of the metal, it is preferably base metal such as one or more of Cu, Fe, Mn, Sn and Cr, mixtures thereof and alloys thereof. Copper is especially preferred.

U.S. Pat. No. 3,929,674 discloses a metallising composition of a finely divided conductor powder selected from the class of noble metals consisting of Pt, Pd, Au, Ag, and mixtures, alloys and oxides thereof dispersed in an inert liquid vehicle, additionally comprising finely divided aluminium boride. In contrast, the present composition is preferably free from boron moieties apart from the elemental boron, and in particular free from aluminium boride.

U.S. Pat. No. 4,101,710 discloses a conductive silver composition useful for producing in a single application step solderable metal coatings on ceramic titanate bodies, said silver composition being a mixture of finely divided inorganic particles dispersed in a vehicle, the inorganic particles consisting essentially of about, by weight, (1) 75–98% silver, (2) 2–6% boron, and (3) 1–22% glass, $PbF_2$ or mixtures thereof.

In contrast, the present composition is preferably free from $PbF_2$.

Certain of the present advantageous compositions are novel and advantageous and the invention provides them per se. In particular, the invention provides the present composition whose solids portion contains:

(A) 0.5–7% of alumina;

(B) 0.5–10% of metal other than silver; or (C) 0–8% of glass frit and, based on the weight of the elemental silver and/or precursor thereof, measured as silver, between 0.7 and 2% of the elemental boron.

The present silver composition can be prepared by admixing the ingredients. It can be prepared and used in conventional ways. The silver composition is advantageously employed to form electrically conducting silver tracks on glass by applying the composition to the glass, usually by printing, and then firing the composition. The conductive tracks can be used as elements of a window heater, eg on the front or rear window of a motor vehicle (for instance to de-mist the window, or to heat the glass behind the blade of a wiper to alleviate it sticking to the glass in icy conditions), as elements of alarm circuits, eg on side windows of a motor vehicle, as elements of radio antennae, eg on windows of a motor vehicle, or as electrical wiring, eg on the rear window of a motor vehicle to connect to a stop-light mounted in the rear window. The silver tracks can themselves form the necessary conducting tracks, or the silver tracks can be augmented with additional conductor. Thus, for instance, after firing the silver composition, it can be electroplated with a layer of copper and then with a layer of nickel, to provide the overall conducting track.

The silver composition is usually applied by screen printing. The composition may be dried before a separate firing stage, for instance where the composition is to be overprinted or the product is to be stored before firing.

Preferably, the silver composition is applied onto an enamel composition on the glass, and before, or preferably after, application of the silver composition, the enamel composition is fired, whereby after firing the enamel composition and the silver composition, the enamel composition obscures the silver tracks underneath from viewing through the glass. The enamel composition can be applied conventionally, usually by screen printing. After drying or curing the enamel composition, the silver composition is preferably applied. The silver composition and the enamel composition are preferably fired in the same firing. Advantageously, the glass is bent in the firing of the silver composition, usually to the desired curved shape of a motor vehicle window.

The enamel usually comprises 70–95% glass frit and 5–30% pigment. The pigment is usually in the form of metal oxides or sulphides or mixed metal oxides such as spinels. An example is copper chromite. The enamel is usually applied in the form of an enamel composition comprising the frit and pigment in a carrier medium.

The enamel composition can be conventional. It has been found, however, that though the present silver composition improves the obscuring of bus bars, particularly when on conventional enamel compositions containing noncrystallising lead borosilicate frits, with some enamel compositions, in particular those based on crystallising frits, the silver tracks can nevertheless be slightly visible. This seems to be due to greyish discolouration of non-overprinted parts of the enamel as a result of crystallisation, rather than to undue silver migration; this problem is however less severe in the case of the present silver composition than in the case of conventional silver compositions.

Advantageously, the present silver composition is used in combination with an enamel composition which contains a small amount of reducing agent; this reduces the silver migration even further. Although it is known that addition of reducing agent to the enamel composition may inhibit the show-through of overprinted silver bus bar, it is surprising that much lower levels of reducing agent are required in the enamel composition when used in combination with the present silver composition than with conventional silver compositions. It is a particular feature of the present invention that the silver composition can be applied onto an enamel composition which is insufficient in itself to obscure the bus bars. The enamel composition preferably comprises glass frit, pigment and elemental boron, especially 0.1–0.5% of the boron based on the total weight of the frit, pigment and boron. A significant effect on obscuring silver bus bars has been observed when a boron-containing enamel composition was overprinted with the present silver composition when no or only marginal effects were observed with conventional silver compositions. Generally, the 0.1–0.5% boron is sufficient to obscure excellently silver bus bars made from the present composition. The use of this lower amount of boron in the enamel composition than if the same obscuring was achieved with a higher amount and a conventional silver composition, enables the detrimental effects of the boron on the firing of the enamel composition to be reduced.

Alternative reducing agents can also be employed in the enamel composition. Suitable reducing agents are metal powders such as those of nickel, iron, manganese, copper, aluminium, magnesium, bismuth, antimony, lead, tin, silver, zinc and mixtures and alloys thereof, and powdered non-metal elements such as boron, carbon, silicon, phosphorus, sulphur, selenium, tellurium and mixtures thereof. Further suitable reducing agents according to the present invention are inorganic compounds such as metal sulphides, carbides, borides, silicides, nitrides, selenides and tellurides. Examples of suitable inorganic compounds are molybdenum disilicide, tungsten disilicide, boron carbide, silicon carbide, boron nitride, niobium boride, copper sulphide, lead sulphide, iron sulphide, zinc selenide and zinc telluride. Mixtures of the various reducing agents can be employed. Some of the reducing agents have previously been reported to affect the sticking of the enamel composition to the mould in the press bending process when added in larger amounts. Thus, the addition of 25–35% zinc powder together with colour-forming metal oxides has been proposed to avoid sticking of the enamel composition to the mould. Joint addition of greater than 5% zinc powder and low-valent metal oxides such as stannous oxide has been proposed to provide an even better non-stick behaviour. A number of other metal powders, including chromium, copper, cobalt, manganese, iron, nickel, titanium, tungsten and non-metal powders such as chromium carbide, silicon and tellurium have also been proposed as effective additives in order to achieve non-stick behaviour. A similar effect has been proposed for aluminium. Typically, the amount of metal powder that has to be added in order to achieve non-stick behaviour is greater than 5%. Joint addition of boron and metal powders to the enamel composition has been found to have an advantageous effect when the present silver composition is employed.

Alternatively or in addition to the enamel composition layer on which the silver composition is applied, an enamel composition can be applied (usually by printing) on the silver composition layer. This can be done in order to obscure bus bars from inside motor vehicles.

The present silver composition can be fired in conventional ways. Usually it is fired at 540°–800° C. Usually it is fired for 2–20, preferably 2–5, minutes. The firing time depends on the thickness of the glass.

The present glass is preferably that for a window, especially a window of a vehicle.

When green glass is decorated with a black enamel composition and then overprinted with a conventional silver composition, a bright blue colour is developed under the overprinted area after extended firing. The development of the blue colour is related to the migration of silver ions through the enamel and growth of colloidal silver in the glass-enamel interface. If the firing time is further extended, the blue colour becomes more intense and eventually turns light blue. When the present silver composition is employed instead of the conventional one, the formation of blue colour under the bus bars is strongly inhibited.

The invention is illustrated by the following Examples.

EXAMPLE 1

A screen-printable boron-containing silver paste is prepared by adding 2 g boron powder (crystalline, 325 mesh, from Johnson Matthey Alfa, Germany) to 100 g of conventional silver paste AgO73 (which consists of 75% solids portion and 25% organic carrier medium, the solids portion consisting of 97.6% silver, 2% low melting glass frit and 0.4% additives, and is from Cookson Matthey BV, Maastricht, The Netherlands), mixing and triple-roll milling. A clear float glass plate of 200×300 $mm^2$ size and 4 mm thickness is decorated on the tin side by screen-printing using a 77T screen with a black enamel composition 39706-456-63 (Cookson Matthey BV, Maastricht, The Netherlands). After drying at 180° C., one part of the decorated area of the glass plate is overprinted with the boron-containing silver paste described above and another part overprinted with the unmodified conventional silver paste AgO73. After drying, the glass plate is fired in a vertical furnace at 760° C. for 120 seconds.

In the case of the conventional silver paste, the overprinted and non-overprinted areas are clearly discernable. The difference in lightness, L, according to the CIElab system, between overprinted and non-overprinted areas was found to be 0.6, the overprinted area being darker than the non-overprinted area. In the case of the boron-containing silver paste, the difference in L between the overprinted and non-overprinted areas was found to be 0.2; with the naked eye, almost no colour difference could be noticed between overprinted and non-overprinted areas.

EXAMPLE 2

The same boron-containing silver paste as in Example 1 is used.

One part of a clear float glass plate of 200×300 $mm^2$ size and 4 mm thickness is decorated on the tin side by screen-printing using 77T screen with the black enamel composition described in Example 1.

Another part of the glass plate is decorated using an enamel composition which is the same except that it contains 0.5 wt % boron powder, based on the total weight of its frit, pigment and boron. After drying at 180° C., one part of the glass plate decorated with the non-boron-containing enamel is overprinted with the boron-containing silver paste described in Example 1, and another part is overprinted with the conventional silver paste described in Example 1. In the same way, the part of the glass plate decorated with the boron-containing enamel composition is overprinted with the boron-containing silver paste and the conventional silver paste. After drying, the glass plate is fired in a vertical furnace at 760° C. (furnace settings) for 120 seconds.

Visual inspection of the fired glass plate clearly shows that in those parts of the glass plate overprinted with the conventional silver paste, the overprinted and non-overprinted areas are readily discernable with the naked eye, with only marginal differences between the boron-free and the boron-containing enamel. L values characterising the differences in lightness between the overprinted and non-overprinted areas are given in Table 1. For those parts overprinted with the boron-containing silver paste, overprinted and non-overprinted areas were difficult to distinguish with the naked eye. The boron-containing enamel led to a further reduction in lightness difference, L, as shown in Table 1.

TABLE 1

Difference in lightness, L, between various parts of the glass plate as described in Example 2

| Silver overprint Enamel: | Conventional silver paste | B-containing silver paste |
|---|---|---|
| 39706-456-63 | 0.6 | 0.2 |
| 39706-456-63 + 0.5% B | 0.5 | 0.1 |

EXAMPLE 3

An enamel composition comprising 20% by weight of a black copper chromite pigment and 60% by weight of a lead borosilicate frit 5227F (available from Cookson Matthey BV, Maastricht, The Netherlands) is made by mixing with 20% by weight of the screen-printing medium 456-63 and subsequent triple-roll milling. This enamel composition is screen-printed onto the tin side of a 200×300 mm² and 4 mm thick green glass plate using a 77T screen. After drying at 180° C., the enamel composition is overprinted with the boron-containing silver paste described in Example 1. For comparison, a second glass plate is also decorated with the black enamel composition and then overprinted with the conventional non-boron-containing silver paste. Both glass plates were fired at 760° C. (furnace setting) for 150 seconds.

No silver overprint was visible in the case of the boron-containing silver paste when viewed from the glass side. On the other hand, the glass plate overprinted with the conventional silver paste exhibited a brilliant blue silver bus bar when viewed from the glass side.

EXAMPLE 4

A screen-printable boron-containing silver paste is prepared by mixing and subsequently triple-roll milling 61 g of spherical silver powder (mean diameter 1–2 μm), 10 g of silver flakes, 4 g of boron powder (amorphous 325 mesh, from Johnson Matthey Alfa, Germany) and 25 g of an organic carrier medium consisting of 10 g of medium 578-63 and 15 g of medium 579-63 (both from Cookson Matthey BV, Maastricht, The Netherlands).

A float glass plate of 200×300 mm² size and 2 mm thickness is decorated on the tin side by screen-printing using a 77T screen with a black enamel composition 39706-318-63 (from Cookson Matthey BV, Maastricht, The Netherlands). After curing with UV light, one part of the decorated area of the glass plate is overprinted with the boron-containing silver paste described above. Another part of the decorated area is overprinted with a silver paste similar to the one described above but not containing any elemental boron. The glass plate is then fired for 5 min at 610° C. Whereas those parts of the glass plate overprinted with the conventional silver paste were clearly distinguishable from the non-overprinted areas, almost no colour differences could be noticed between the non-overprinted areas and those overprinted with the boron-containing silver paste.

EXAMPLE 5

A screen-printable boron-containing silver paste is prepared by mixing and subsequently triple-roll milling 71 g of spherical silver powder (325 mesh), 2 g of finely powdered alumina, 2 g of boron powder (amorphous, 325 mesh, from Johnson Matthey Alfa, Germany) and 25 g of an organic carrier medium consisting of 10 g of medium 578-63 and 15 g of medium 579-63 (both from Cookson Matthey BV, Maastricht, The Netherlands).

A float glass plate of 200×300 mm² size and 3 mm thickness is decorated on the tin side by screen printing using a 77T screen with a black enamel composition comprising 20% (by weight) black copper chromite pigment, 60% (by weight) powdered lead borosilicate frit 5227F (from Cookson Matthey BV, Maastricht, The Netherlands), and 20% (by weight) of the screen-printing medium 456-63 (also from Cookson Matthey BV, Maastricht, The Netherlands). After drying at 180° C., the decorated part of the glass plate is overprinted with the boron-containing silver paste described above. The glass plate is then fired at 720° C. for 2 min.

Good hiding of the overprinted silver and improved scratch resistance after exposure to 5% HCl solution was found.

EXAMPLE 6

A screen-printable boron-containing silver paste of improved acid resistance is prepared by mixing and subsequently triple-roll milling 61 g of spherical silver powder (mean diameter 1–2 μm), 10 g silver flake, 1.5 g boron powder (amorphous 325 mesh, from Johnson Matthey Alfa, Germany), 4 g of powdered frit 2160BF (from Cookson Matthey BV, Maastricht, The Netherlands), 2 g of copper powder (Aldrich) and 21.5 g of an organic carrier medium consisting of 10 g of medium 578-63 and 11.5 g of medium 579-63 (both from Cookson Matthey BV, Maastricht, The Netherlands).

A float glass plate of 200×300cm² size and 2 mm thickness is decorated on the tin side by screen-printing using a 77T screen with the black enamel described in Example 3. After drying at 180° C., the enamel is overprinted with the boron-containing silver paste and fired at 760° C. (furnace setting) for 120 seconds.

Good hiding of the overprinted silver and improved scratch resistance after exposure to 5% HCl solution was found.

We claim:

1. A method of forming electrically conducting silver tracks on glass, by applying a silver composition comprising solids portion in a carrier medium to the glass and then firing the composition to form the tracks, wherein the silver composition is applied onto an enamel composition on the glass, and before or after application of the silver composition, the enamel composition is fired, whereby after firing the enamel composition and the silver composition, the enamel composition obscures the silver tracks underneath from viewing through the glass; said solids portion comprising 0.01–15 wt % elemental boron, 0–85 wt % glass frit, and the balance comprising elemental silver and/or precursors thereof.

2. A method according to claim 1 wherein the solids portion contains 10–99.5 wt % of the elemental silver and/or precursor thereof, measured as silver.

3. A method according to claim 1 wherein the elemental silver and/or precursor thereof is elemental silver.

4. A method according to claim 1 wherein the solids portion contains 0.5–7 wt % of alumina.

5. A method according to claim 1 wherein the solids portion further contains 0.5–10 wt % of metal other than silver.

6. A method according to claim 5 wherein the metal is one or more of Cu, Fe, Mn, Sn and Cr, mixtures thereof and alloys thereof.

7. A method according to claim 1 wherein the solids portion contains 0–8 wt % of glass frit and, based on the weight of the elemental silver and/or precursor thereof, measured as silver, between 0.7 and 2% of the elemental boron.

8. A method according to claim 1 wherein the silver composition and the enamel composition are fired in the same firing.

9. A method according to claim 1 wherein the enamel composition comprises glass frit, pigment and elemental boron.

10. A method according to claim 9 wherein the enamel composition contains 0.1–0.5 wt % of the boron, based on the total weight of the frit, pigment and boron.

11. A method according to claim 1 wherein the grass is bent in the firing of the silver composition.

12. A method according to claim 1 wherein the silver composition is fired at 540°–800° C.

13. A method according to claim 1 wherein the silver composition is fired for 2–20 minutes.

14. A method according to claim 1 wherein the glass is that for a window of a vehicle.

* * * * *